Jan. 24, 1961 G. YATES 2,969,031
MOUNTING AND SEALING MEANS FOR A PRESS DIAPHRAGM
Filed May 25, 1953 6 Sheets-Sheet 1

INVENTOR.
GEORGE YATES,
BY
Paul A. Weilein
ATTORNEY.

Jan. 24, 1961  G. YATES  2,969,031
MOUNTING AND SEALING MEANS FOR A PRESS DIAPHRAGM
Filed May 25, 1953  6 Sheets-Sheet 2

INVENTOR.
GEORGE YATES,
BY
Paul A. Weilein
ATTORNEY.

Jan. 24, 1961  G. YATES  2,969,031
MOUNTING AND SEALING MEANS FOR A PRESS DIAPHRAGM
Filed May 25, 1953  6 Sheets-Sheet 3

INVENTOR.
GEORGE YATES,
BY
Paul A. Weilein
ATTORNEY.

Jan. 24, 1961  G. YATES  2,969,031
MOUNTING AND SEALING MEANS FOR A PRESS DIAPHRAGM
Filed May 25, 1953  6 Sheets-Sheet 5

INVENTOR.
GEORGE YATES,
BY
Paul A. Weilein
ATTORNEY.

United States Patent Office 2,969,031
Patented Jan. 24, 1961

2,969,031

MOUNTING AND SEALING MEANS FOR A PRESS DIAPHRAGM

George Yates, 530 Riverdale Drive, Glendale, Calif.

Filed May 25, 1953, Ser. No. 357,045

4 Claims. (Cl. 113—44)

This invention relates to presses for forming and shaping sheet material by applying fluid pressure to a flexible and conformable element which presses the work against a forming block or die.

It is an object of this invention to provide a press such as described in which a novel, comparatively inexpensive, flexible and conformable element for pressing the work to conform to a die, is subject to efficient use over long periods of time without replacement.

It is a further object of this invention to provide a press such as described in which a simple hydraulically actuated diaphragm formed of rubber, synthetic rubber or other similar flexible and conformable material, is arranged to press the work against one or more forming blocks or dies in a manner insuring an economical production of finished parts.

A further object of this invention is to provide a press such as described, wherein the forming diaphragm may be of considerably less thickness than the thickness of the flexible and conformable pressing elements heretofore used, whereby accurate forming operations may be effected with less pressure than heretofore required.

It is another object of this invention to provide a press such as described, wherein advantages attending the use of a forming diaphragm as here employed are made possible by a novel means for joining the diaphragm to the supporting member therefor and for forming a seal which precludes cold flow of the material of the diaphragm and consequent failure thereof while maintaining a fluid tight connection of the diaphragm with the supporting member under high pressures.

It is another object of this invention to provide a press such as described wherein a forming head, composed of the diaphragm and the diaphragm supporting member, is constructed and arranged in a manner making possible the simplification of construction and operation of the press as well as other advantages noted herein.

The present form of this invention includes a pair of opposed parallel vertical supporting members 10 and 11, shown as comprising thick steel plates, on which are mounted in vertically spaced relation a press bed 12, a cross beam 13 and other parts of the press as will be hereinafter described. The press bed 12 and the cross beam 13 form with the members 10 and 11 a rigid frame assembly, reinforced by tie bolts 15 above the cross beam 13 and below the press bed 12. While presses formed in accordance with the present invention may be of various sizes vertically as well as transversely, the press here illustrated is such as to require no specially constructed base or foundation and thus the lower ends of the rigid members 10 and 11 constitute supporting legs for the press.

Figure 1:
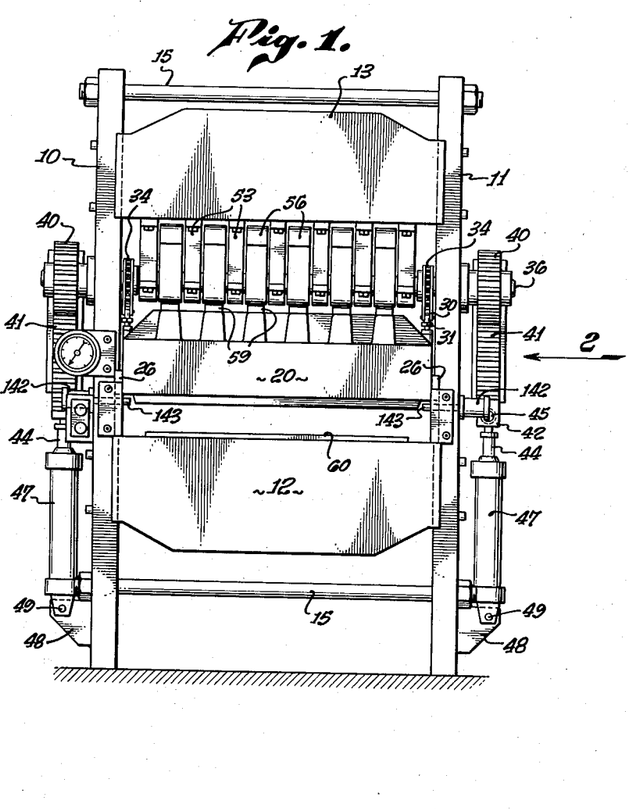
Fig. 1 is a front elevation of a press embodying the present invention.
Figure 2:
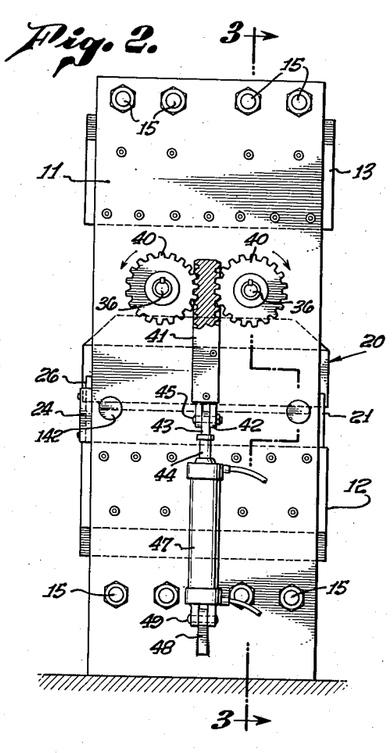
Fig. 2 is a side elevation of the press taken as indicated by the arrow 2 of Fig. 1.
Figure 6:
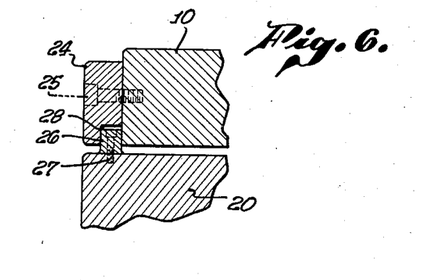
Fig. 6 is a detailed section taken on line 6—6 of Fig. 5.
Figure 7:
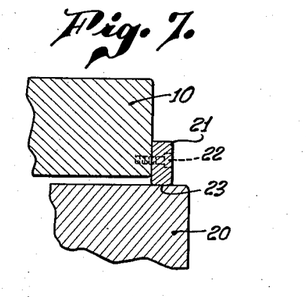
Fig. 7 is a detailed section taken on line 7—7 of Fig. 5.

Intermediate the bed 12 and the beam 13 a forming head 20 is mounted for movement toward and away from the press bed 12 being guided by rails 21 (see Fig. 7) secured to the rear edges of the members 10 and 11 by bolts 22. By this arrangement the inner edges 23 of the rails 21 contact the sides of the head 20 to guide the head for free movement in spaced relation to the members 10 and 11. At the forward edges of the members 10 and 11, rabbeted guide rails 24 are secured by bolts 25 (see Figs. 1 and 6). Adjacent the guide rails 24, the forming head 20 is provided with keys 26 (see Fig. 6) secured to the front edges thereof by bolts 27. By this construction the keys 26 ride in the ways 28 formed by the rabbits of the rails 24, thus cooperating with the rails 21 to maintain alignment of the forming head 20 with the press bed 12 during movement of the head toward and from the bed and while forming pressure is applied to the head.

Figure 5:
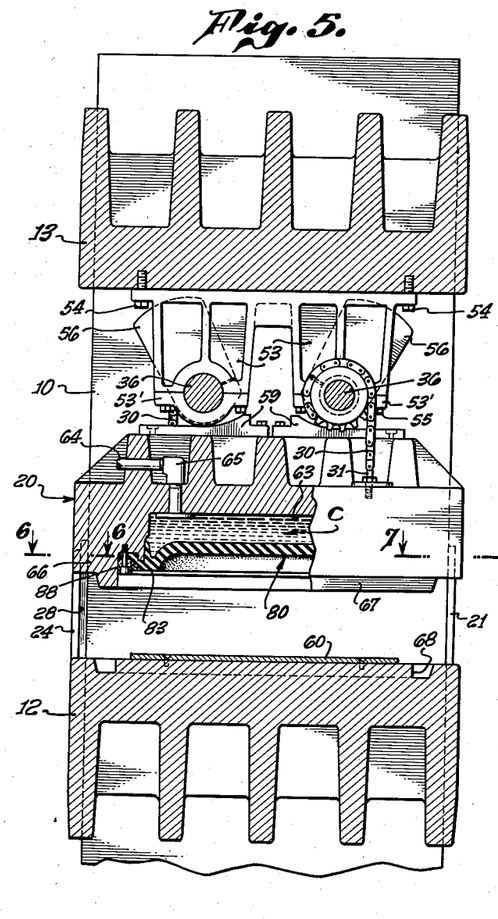
Fig. 5 is a transverse fragmentary sectional view taken at right angles to the view shown in Fig. 3, and showing the forming head in raised position.
Figures 8, 10:
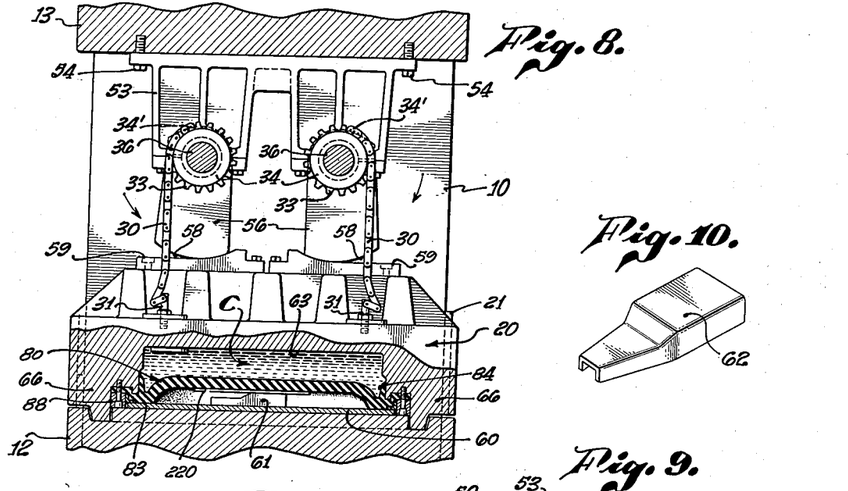
Fig. 8 is a detailed transverse fragmentary section similar to Fig. 5, showing the forming head in lowered operating position.
Fig. 10 is a perspective view of one object or part which may be formed by the press of the present invention.
Figure 11:
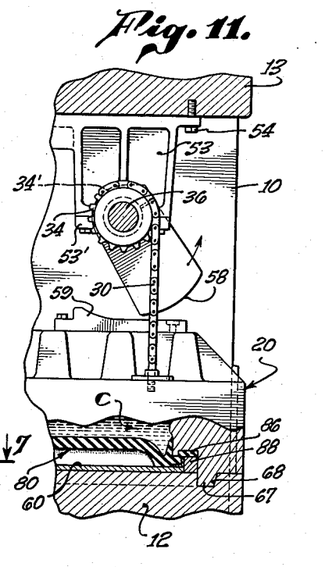
Fig. 11 is a detailed fragmentary section showing how one of the hold-down members is moved toward head-releasing position from the position shown in Fig. 8.
Figure 12:
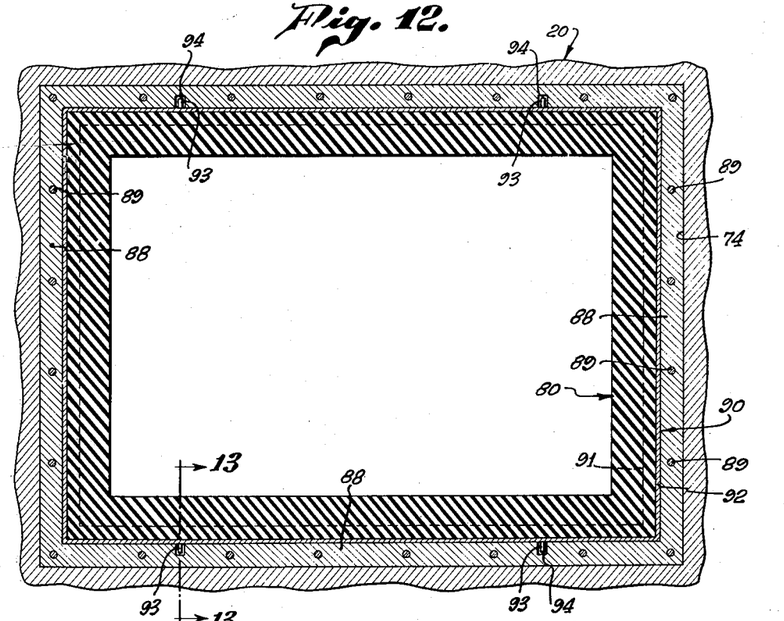
Fig. 12 is a horizontal section taken on the line 12—12 of Fig. 3.

The head 20 is supported for vertical movement toward and away from the bed 12 by means of flexible chains 30 secured to the corners of the head by bolts 31 threadedly engaging sockets 32 in turn secured in any suitable manner to the head 20 (see Figs. 5, 8 and 11). The chains 30 extend upwardly from the head and engage the teeth 33 of lifting sprockets 34 keyed by tapered pins 35 to two pairs of rotary stub shafts 36 extending inwardly through the members 10 and 11. The upper ends of the chains 30 are secured to the sprockets 34 by means of fastenings 34'. The shafts 36 are supported by the members 10 and 11 through the medium of anti-friction roller bearings 37 mounted on the outer faces of the members 10 and 11 by retainer housings 38 and secured in place by bolts 39. Upon rotation of the stub shafts 36, the chains 30 are wound or unwound about the sprockets 34. Thus, as shown in Figs. 5 and 11, as the right hand stub shafts 36 are turned in a counterclockwise direction, the chains 30 will be wound about the sprockets so as to lift the forming head 20. Simultaneous opposite rotation of the left hand stub shafts 36 will synchronously raise the companion chains 30 to insure uniform lifting at the four corners of the head 20. As more clearly shown in Fig. 8, the terminal position of the stub shafts 36 and their sprockets 34 when rotated to lower the head 20, is such as to permit the head 20 to rest upon and be fully supported by the bed plate 12. Such lowering rotation is in excess of the relative downward movement of the head 20 so as to provide slack in the chains 30 when the head is fully lowered to rest upon the bed 12.

Equal, opposite and simultaneous rotation of the right and left hand pairs of stub shafts 36 to insure uniform raising and lowering of the chains 30 is provided by means of drive gears 40 mounted on and secured for rotation with the stub shafts outwardly of the members 10 and 11. Located between each cooperating pair of gears 40 and simultaneously meshing with the inner teeth of both gears, there is provided a double faced reciprocating rack bar 41, reciprocation of which will simultaneously and equally rotate both gears, their stub shafts 36 and the sprockets 34 to raise or lower the chains 30 and head 20.

The lower end of each rack bar 41 is provided with a clevis 42 between the furcations of which is located the upper end 43 of a piston rod 44. Securement of the end 43 within the clevis 42 is provided by a transverse securing bolt 45.

Figure 15:
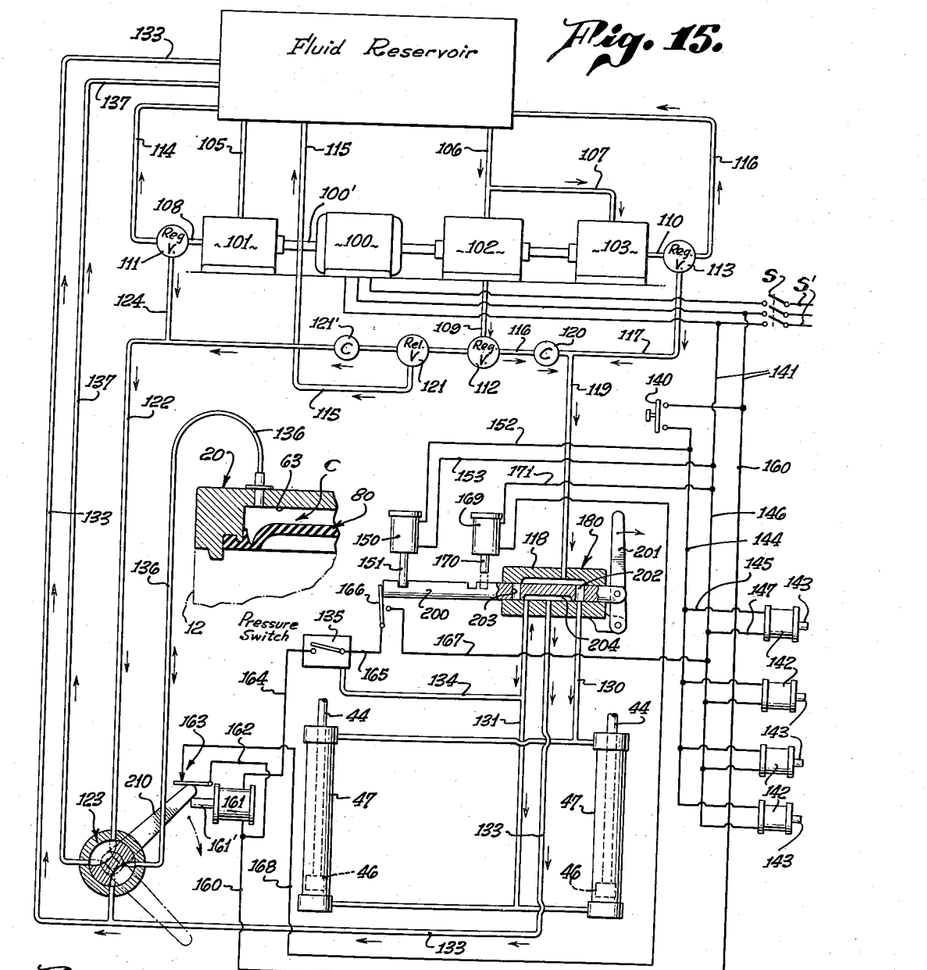
Fig. 15 is a complete schematic diagram of the electro-hydraulic power control and safety system of the present invention.

As indicated in the diagram of Fig. 15, the lower ends of the piston rods 44 are provided with pistons 46 mounted in cylinders 47 supported on the members 10 and 11 upon lugs 48 to which the cylinders are pivoted as at 49. It will be readily seen that application of pressure above or below the pistons 46 will induce vertical reciprocation of the piston rods 44 and rack bars 41 to rotate the gears 40 and stub shafts 36 for raising or lowering the head 20. Application of fluid pressure for reciprocation of the pistons 46 will be hereinafter discussed in connection with the operations of the press.

Figure 4:
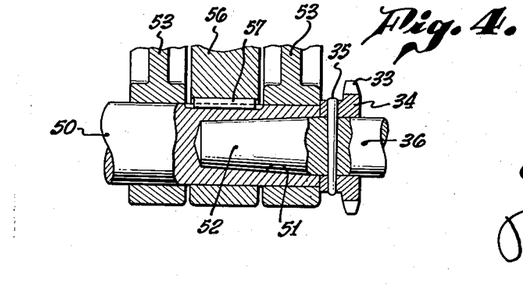
Fig. 4 is an enlarged detailed sectional view, partly in elevation, of the drive connection for the operating shaft of the press, taken on a plane at right angles to the section thereof shown in Fig. 3.

For holding the forming head 20 in proper contact with the bed 12 and against accidental displacement during the forming operation, a novel hold-down mechanism is provided. This hold-down mechanism includes a pair of parallel shafts 50, one mounted between each pair of stub shafts 36, and thus extending across the press between the members 10 and 11. As shown in Fig. 4, the shafts 50 are secured for rotation with the stub shafts 36 by a conical press fit therewith, the ends of the shafts 50 having conical recesses 51 into which are pressed the tapered ends 52 of the stub shafts 36. Thus the shafts 50 are rotated with the stub shafts 36 and the sprockets 34 upon reciprocation of the rack bars 41. The shafts 50 are rotatably supported in bearing hangers 53 depending from the beam 13 to which they are secured by bolts 54. At the lower end of each hanger 53, a bearing cap 53' is secured by bolts 55 to enclose the shaft portion adjacent the hanger.

Hold down arms 56 are secured by keys 57 to the shafts 50 for rotation therewith. There hold-down arms are elevated, as shown in Fig. 5, when the forming head 20 is raised by the chains 30 upon rotation of the stub shafts 36 and shafts 50. Upon rotation of the stub shafts 36 to lower the chains 30 and hence the head 20, the arms 56 are rotated downwardly towards the head 20. The angular relation of the arms 56 upon the shafts 50, however, is such that the arms do not engage the head 20 until the head is seated by weight upon the bed 12 and the chains 30 begin to slacken as indicated in Fig. 8. After the weight of the head 20 is received by the bed 12, further rotation of the stub shafts 36 and shafts 50, slackens the chains 30 and moves the outer end surfaces 58 of the arms 56 into engagement with the curved surfaces of blocks 59 fixed on the head 20. As more clearly shown in Fig. 9, the end surfaces 58 of the arms 56 are not formed on a radius the center of which is the axis of shaft 50. Thus, while the line $R^1$ indicates a radius from the shaft axis, the line $R^2$ indicates that the curvature of the inner or heel end of each surface 58 is curved in a radius somewhat shorter than that of the radius $R^1$. It will also be noted that the upper surfaces of the blocks 59 are curved inwardly at a sweep, the inner ends of which conform substantially with the radius $R^2$. Thus, it will be seen that engagement of the end surfaces 58 of the arms 56 with the blocks 59 does not produce a camming action exerting additional pressure upon the head 20, but that the surfaces merely firmly and securely engage the surfaces of the blocks to preclude any upward retrograde movement of the head 20 during the forming operation. This construction therefore precludes any jamming or binding between the surfaces 58 and the blocks 59, and hence free return movement of the arms 56 after the pressing operation is permitted without use of excessive power. As the chains are in slackened position when the stub shafts 34 and shafts 50 are first rotated in the head lifting cycle, the arms 56 are free to leave their hold-down engagement with the blocks 59 of the head 50 before the chains commence to lift the head.

The structural relationship between the bed 12 and the head 20 is best shown in detail in Figs. 9 to 14, inclusive. The bed 12 is surmounted by a fixed platten 60 upon which are mounted the forming blocks or dies 61. In view of the construction and operation of the pressure-applying diaphragm and its mounting which will be hereinafter discussed, the forming blocks 61 may be of a wide variety as to number, shape, size and height. By way of example, the forming block or die 61 here shown, is designed for the forming of the finished part 62 shown in Fig. 10. While the invention is broadly applicable to many types and varieties of press operations, it is here shown and ideally suited to the forming of structural parts and elements such as those made of sheet metal as frequently used in aircraft manufacture.

Above the platten 60 the head 20 is formed with a pressure cavity or chamber 63 to which fluid pressure may be applied through a pressure conduit 64 (see Fig. 9) movable with the head. A connecting elbow 65 connects the conduit 64 with a flanged nipple opening into the cavity 63. The sides 66 of the head 20 extend downwardly below the cavity or chamber 63, being provided with a bed engaging bead 67 receivable in a bed groove 68 when the head is in fully lowered position upon the bed. It will be noted of course that the inwardly inclined side edges of the bead 67 will assist in insuring proper registration of the head cavity with the platten 60 as the head is lowered. Contact of the bead 67 with the conforming inclination of the outer walls of the groove 68 acts to guide the head as it comes to rest upon the bed 12.

The side walls of the cavity 63 are formed with an enlarged mouth portion 70 terminating in a peripheral lip 71. From the outer side 72 of the lip 71 an outwardly directed horizontal surface 73 is provided. This surface is bounded by a vertical wall 74 which extends downwardly to form the inner straight side of the bead 67.

The forming diaphragm of the present device is designated 80, and as here shown is rectangular, but may be otherwise shaped depending upon the formation of the head 20. This diaphragm is provided with a central upwardly dished or cupped body portion formed with downwardly directed marginal portions 82 having a platen-engaging peripheral flat terminal portion 83.

The diaphragm is formed with a continuous sealing flange 84 which fits into the enlarged mouth portion 70 of the cavity 63 thereby closing the cavity and forming an expansible chamber C in the head. Upon application of fluid pressure to the chamber C, the flange 84 will be urged against the portion 70 to form a seal while at the same time a pressure component is applied to move the body portion of the diaphragm outwardly, as in a forming operation.

Figure 9:
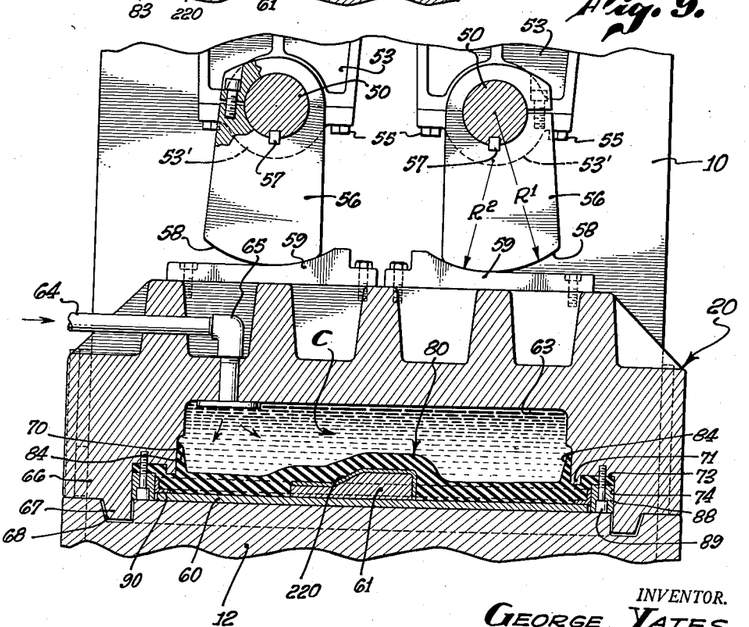
Fig. 9 is a fragmentary detailed transverse section similar to Fig. 8, showing the die and diaphragm after pressure is applied to the diaphragm.
Figures 13, 14:
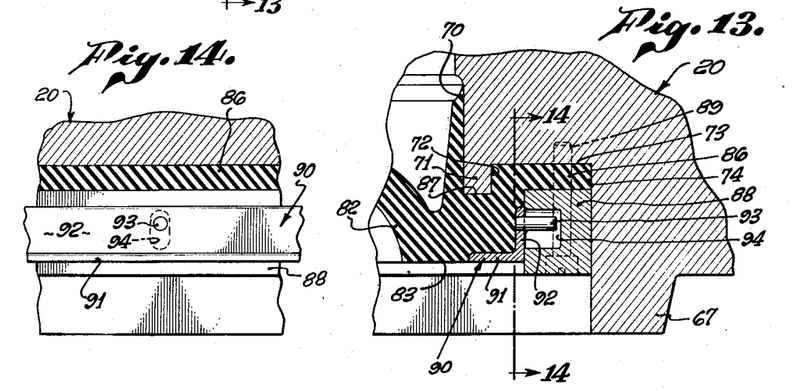
Fig. 13 is a detailed section taken on the line 13—13 of Fig. 12.
Fig. 14 is a detailed section taken at right angles to that of Fig. 13, as shown by the line 14—14 thereof.

The diaphragm is also provided with a marginal flange 86 having a recess 87 therein for reception of the peripheral lip 71 to assist in the retention of the diaphragm 80 and the sealing thereof to the mouth of the cavity 63. The horizontal flange 86 is caused to be firmly and sealingly engaged with a surface 73 of the head between the lip 71 and the wall 74 by means of a continuous rectangular frame 88 secured to the head by bolts 89 passing through the horizontal flange 86 (see Figs. 12, 13 and 14). The outer side surface of the frame 88 contacts the vertical wall 74 of the bead 67, whereas the bottom or lower surface of this frame is adapted to rest on the bed 12 as shown in Figs. 9 and 13.

An important provision of this invention is the prevention of cold flow of the material of the elastomer diaphragm 80 between the head 20, platten 60 and/or the bed 12, or around the edges of the frame 88. For this purpose, a floating angle frame 90 (see Fig. 13) is provided. As here shown, this frame has a continuous, horizontal inwardly extending leg 91 which, while pressure is applied, rests upon the platten 60 under the portion 83 of the diaphragm. The frame 90 also includes a continuous vertical leg 92 which bears against a vertical surface 92' of the portion 83, as well as against the inner side face of the frame 88. The floating, sealing frame 90 is vertically adjustably secured within the fixed frame 88 by means of outwardly extending horizontal pins 93 slidably mounted in vertically elongated recesses 94 on the inner face of the frame 88. By this construction, as pressure is applied to the diaphragm, such pressure as exerted through the diaphragm acts to force the floating frame 90 against the platten 60, as well as against the frame 88, with a pressure proportionate to the diaphragm pressure so as to form a seal precluding flow of the diaphragm material thereunder. By reason of the construction and arrangement of the frames 88 and 90, also sealing flange 84, the diaphragm will withstand exertmely high pressures without failure, thereby making frequent replacement of the diaphragm unnecessary. Moreover, this means of securing and sealing the diaphragm, makes it possible to use a comparatively thin and inexpensive form of diaphragm which may be easily replaced when required. In being compartively thin, the diaphragm will readily conform to the die and prove more efficient as a forming medium under less pressure than would a thicker and heavier diaphragm.

Referring now to the diagram of Fig. 15, it will be seen that actuation and control of the press is effected by means of an electro-hydraulic system incorporating cooperating mechanical, electrical and fluid pressure elements insuring the proper sequential operation of the press under a high safety factor.

A motor 100 operates a drive shaft 100' which is common to and drives a high pressure pump 101, a low pressure pump 102 and an intermediate pressure pump 103 for supplying hydraulic pressure for actuating and controlling the press. The motor 100 is controlled by a manual switch S connected with line conductors S' leading from a suitable electrical source (not shown).

With motor 100 energized, fluid is supplied to the pumps 101, 102 and 103 from a suitable fluid source such as reservoir 104, by intake pipes 105, 106 and 107 leading to pumps 101, 102 and 103 respectively. Fluid passes under pressure from the pumps by way of discharge conduits 108, 109 and 110, to pressure regulator valves 111, 112 and 113. Fluid return to the reservoir 104 from the valves 111, 112 and 113 is provided by conduits 114, 115 and 116 respectively. From the low pressure regulator valves 112, fluid may be supplied through conduits 116 and 117 to the cylinder control valve housing 118 by a conduit 119. A check valve 120 is interposed between the regulator valve 112 and conduit 119 so as to preclude build up of intermediate pressure in opposition to the low pressure supplied by pump 102.

Fluid pressure is also supplied from pressure regulator valve 112 and a relief valve 121, past check valve 121' to the chamber C in the head 20, by way of supply conduit 122 and a valve chamber 123. High pressure from regulator valve 111 may also be supplied to the valve chamber 123 by conduit 124 leading therefrom to the supply conduit 122.

From the cylinder control valve housing 118, pressure conduits 130 and 131 lead to the tops and bottoms respectively of cylinders 47, while a third conduit 132 leads from the housing 118 to the valve chamber 123 and fluid return conduit 133 leading to reservoir 104. From the conduit 131 a branch 134 leads to pressure switch 135 for controlling the valve chamber 123 as will be hereinafter explained. From the valve chamber 123, a conduit 136 leads to the chamber C in the head 20 for the supply or return of pressure fluid, while a second return conduit 137 leads from valve chamber 123 to the reservoir 104.

The electrical system, in addition to the main control switch S, includes a second manual control switch 140 connected to conductors 141 leading from the motor circuit so as to permit energization of a secondary electrical circuit under control of switch 140, only when motor 100 is operating and pressures are available in the hydraulic system.

Figure 3:
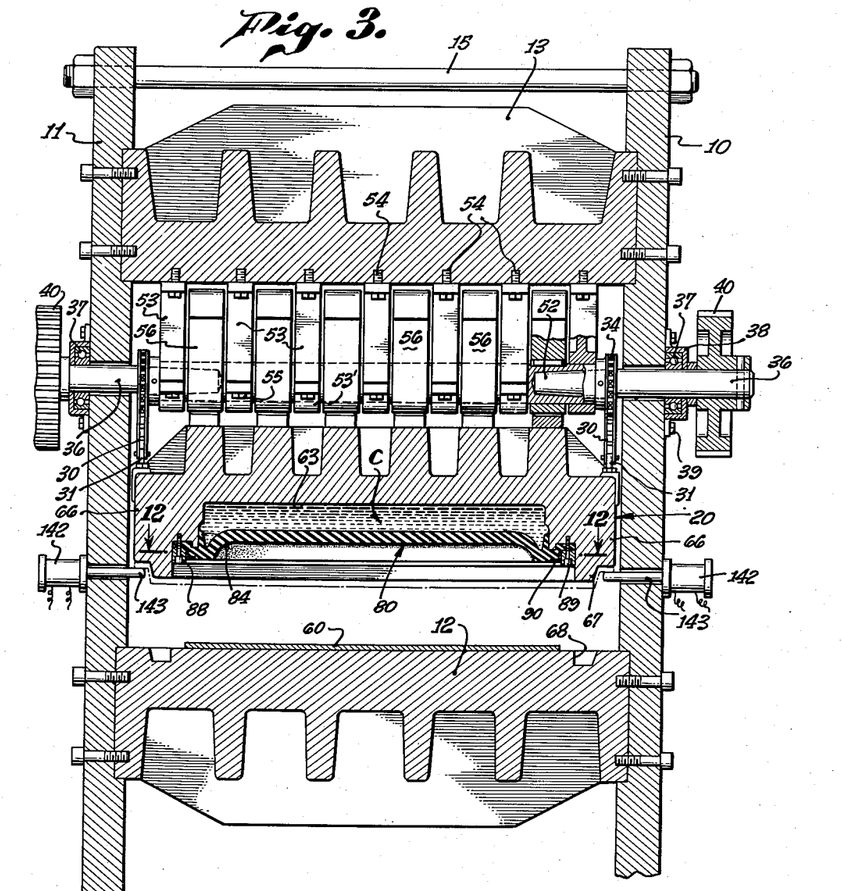
Fig. 3 is an enlarged vertical sectional view taken on the line 3—3 of Fig. 2.

Under direct control by switch 140 are four safety solenoids 142 mounted on the members 10 and 11. The armatures 143 of these solenoids are slidable through the members 10 and 11, beneath the head 120 (see Fig. 3). Thus, when solenoids 142 are deenergized the armatures 143 extend beneath the head 120 to preclude inadvertent or accidental lowering of the head as by leakage in the cylinder system. When the solenoids are energized the armatures 143 are withdrawn and permit free movement of the head.

The circuit for the solenoids 142 includes the power conductor 144 leading from switch 140, individual leads 145 therefrom to the solenoids and a return conductor 146 with individual solenoid leads 147. Also under direct control of switch 140 is solenoid 150, the armature 151 of which retains the valve member 200 of the cylinder valve 180 in the position shown in Fig. 15. Solenoid 150 is connected with the conductors 144 and 146 by means of the conductors 152 and 153 respectively.

A power conductor 160 leads to a solenoid 161 with a branch 162 leading to a switch 163. From solenoid 161 a conductor 164 leads to pressure switch 135. A conductor 165 leads from switch 135 to switch 166 connected by conductor 167 to return conductor 146. From switch 163, a conductor 168 leads to a solenoid 169, the armature 170 of which is in raised position in Fig. 15. A lead 171 connects the return side of the solenoid 169 with the return conductor 146.

In the operation of the press, assuming the forming head 20 to be in raised position as shown in Figs. 1 to 5 inclusive with the safety armature 143 blocking downward movement of the head, and further assuming the switch S to have been closed energizing the motor 100, fluid is delivered from the low pressure pump 102 through conduit 109, regulator valve 112 and check valve 120 to the cylinder valve 180 through conduit 119. Fluid will also be delivered from the intermediate pressure pump 103 and regulator valve 113 to conduit 119. The large volume low pressure fluid from the pump 102 is provided for rapidly filling the cylinders 47 and also for rapidly filling the forming head chamber C.

The regulator valve 112 is preferably set at approximately 250 p.s.i. and upon reaching that pressure the fluid is diverted by the valve 112 to the valve 121 and thence through the conduit 122 to the valve chamber 123. When the fluid pressure against the valve 121 reaches a pressure of 500 p.s.i. the valve 121 operates to cause the entire volume of fluid supplied by the low pressure pump 102 to be returned to the fluid reservoir tank 104 through the return conduit 115.

The intermediate pressure pump 103 discharges through its regulator valve 113 to provide a 1,000 p.s.i. pressure for actuating the pressure switch 135 when fluid is not flowing through the conduit 119, check valve 120 being then effective to prevent cross flow or loss from the intermediate pump to the low pressure pump. It will be understood of course that while pressure is maintained by the intermediate pressure pump 103 actual fluid flow is diverted by the regulator valve 113 so as to return fluid to the reservoir 104 through the conduit 116.

The high pressure pump 101 discharges through relief valve 111 to provide high pressure for the chamber C through conduit 122, cross flow therefrom to the low pressure circuit being precluded by check valve 121'. With the parts in the position shown in Figs. 1 to 5, and by the diagram of Fig. 15, it will be seen that fluid from both the high and low pressure pumps is being returned to the reservoir 104 as is the fluid from the high pressure pump 101 which is returned to the reservoir through the conduit 137.

Figure 17:
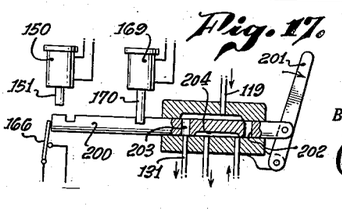
Fig. 17 is a detailed illustration of the head control valve in head lowering position.

With the switch S closed, conductors 141 provide energy for the control circuit illustrated. However, since this circuit is secondarily controlled by the switch 140, all parts will be retained in their original position until the switch 140 closes the circuit including the feed conductors 144 and 146. Upon such closing, the solenoids 142 will be energized to retract the head safety armatures 143, thus conditioning the head for downward movement. Such closing of the switch 140 also establishes a circuit through the conductors 152 and 153 to energize solenoid 150, whereby the armature 151 is retracted from the valve member 200 of the valve 180. With the valve member 200 released, the valve handle 201 may be manipulated to slide the valve member 200. In the inoperative position shown in the diagram, the aperture 202 in the valve member 200 establishes communication from the conduit 119 to the conduit 130 which opens into the tops of the cylinders 47, and since the pistons 46 of the cylinder are already at their lowest position, this application of pressure through the conduit will cause no movement of the pistons. When the valve handle 201 is moved in clockwise direction, the valve member 200 assumes the position shown in Fig. 17 in which the port 203 is brought into registration with the conduit 131 thus delivering fluid under pressure to the cylinders 47 below the pistons 46 therein. At the same time the cavity 204 in the valve member 200 bridges the ends of the conduits 130 and 132 so that as pressure is applied below the pistons 46 the fluid thereabove may emerge from the cylinders by way of conduit 130. This fluid will pass through the valve cavity 204, thence through the conduit 132, valve 123 and conduit 136, thereby providing an initial low pressure filling of the pressure chamber C in the head 20, the fluid thereafter returning to the fluid reservoir 104 through the conduit 133.

Thus, it will be seen that after the switch S is closed the switch 140, being of the push button type, may be closed and so held to energize solenoids 142 and withdraw the armature 143, also to withdraw the solenoid armature 151 from the valve member 200 whereby the valve may be moved to raise the pistons 46 within the cylinders 47 and to fill the chamber C in the head 20. The switch 140 is released and opened after the valve 180 is actuated to move the head 20 downwardly.

As the pistons rise it will be understood that the rack bars 41 are raised therewith and rotate the gears 40 and the shafts 36 and 50 so that the sprockets 33 will lower the head 20 through the chains 30. At the extremity of rotation of the shafts 50, the hold-down arms 56 engage the hold-down plates 59 to securely lock the head in position for operation on the bed 12.

Movement of the valve member 200 outwardly upon actuation of the valve handle 201 will cause contact of the switch 166 whereby energy may be supplied through the conductors 167 and 165 to the pressure switch 135. When the pistons 46 reach the top of their movement pressure builds up in the conduit 131 and therefore in the conduit 134. The pressure switch 135 is set for example to operate at 1000 pounds p.s.i. and will close at that pressure whereupon a circuit is established through the conductor 164 for the solenoid 161 so that the armature 161' is retracted and releases the valve handle 210 of the valve 123 to permit manual operation thereof. The handle 210 also controls the switch 163 so that while the handle is in raised position the switch 163 is closed and energizes the solenoid 169 to hold armature 170 retracted. When the valve handle 210 is released by the solenoid 161 which can only happen with the valve member 200 of valve 180 in the position shown in Fig. 17 and the pressure switch 135 is open, movement of the handle to actuate valve 123 causes the switch 163 to open. The solenoid 169 is de-energized upon this opening of switch 163 and the armature 170 drops into engagement with the valve member 200 to preclude subsequent movement thereof until the valve handle 210 is restored to the initial position illustrated in Fig. 15.

Figure 16:
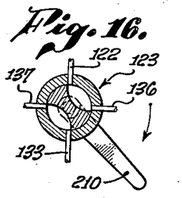
Fig. 16 is a detailed illustration of the pressure chamber control valve in position for applying pressure to the diaphragm.

When the valve 123 is moved by the handle 210 to the position shown in Fig. 16 fluid pressure from the high pressure pump through regulator valve 111 is admitted through conduit 136 to the cavity 63 and the forming operation of the press will take place. Pressure fluid from the conduit 136 enters the chamber C in the head 20, through the connection 64, forcing the flexible diaphragm 80 downwardly against the work illustrated at 220 in Fig. 9, causing the work to conform to the shape of the die 61 resting on the platten 60. After sufficient application of pressure in this manner to the chamber C at which time the fluid flow from the conduit 132 is directed back to the reservoir 104 through the conduit 133, the handle 210 is returned to its original position shown in Fig. 15, thus terminating the high pressure application to the cavity and permitting pressure relief by establishing communication between the conduit 136 and the conduit 133. Such return to the valve also re-establishes contact through the switch 163 thus re-energizing the solenoid 169 and raising the armature 170 to permit return movement of the valve member 200. Upon re-establishment of the original position of valve member 200, pressure is relieved from beneath the pistons 46 and the fluid in the cylinders thereunder may pass upwardly through the conduit 131 through the valve recess 204 and downwardly through the conduit 132 to return to the reservoir through the conduit 133 at the same time pressure is relieved from pressure switch 135 which causes de-energization of the solenoid 161 whereby the handle 210 of the valve 123 is secured against movement. This return of the valve member 200 to original position also opens switch 166 which insures de-energization of the solenoid 161 even through pressure is not immediately relieved from the pressure switch 135. With the valve member 200 in the original position it will also be seen that pressure is again admitted from conduit 119 through the valve 180 to the conduit 130 which supplies pressure fluid to the top of the pistons 46 in the cylinders 47 to move the cylinders downward and therewith the racks 41 so as to move the hold-down arms 56 outwardly from the head 20 in the direction shown in Fig. 11 and thereafter to rotate the shafts 50 to raise the head to original position. Since neither the solenoids 142 nor the solenoid 150 are energized with the parts in this position the valve member 200 will again be locked in the starting position shown in Fig. 15 and the safety armatures 143 of solenoids 142 will be restored to safety position shown in Fig. 15.

From the foregoing it will be seen that the invention not only embodies novel and improved structural features relating to the means for moving and controlling the head, locking the same in downward position and causing the flexible pressure member to force the work material against the dies but that a novel control and safety arrangement is provided involving a combined electrohydraulic system with interlocking mechanisms insuring the proper sequence of operational functions. As hereinbefore indicated it will be understood that while these various inventive concepts are here presented in a single, efficient and effective instrumentality certain of these devices may be independently incorporated in various similar types of apparatus. It will further be understood that the invention is not confined to the specific structural details herein set forth but that changes and modifications and the full use of equipment may be resorted to in the practice of the invention without departure from the spirit or scope thereof as outlined in the appended claims.

I claim:

1. In a press: a pressure applying head; adapted to be engaged with a press bed; means forming in said head a pressure chamber including a flexible diaphragm; said head having a marginal portion surrounding said diaphragm; said marginal portion being adapted to contact said bed; means for securing the edges of said diaphragm to said head adjacent said marginal portion including a rigid clamping frame between which and said head said edges are confined; and means for preventing marginal portions of said diaphragm from being extruded laterally between said clamping member and said bed; said last named means including a floating frame and means mounting said floating frame on said head for movement relative thereto by said diaphragm into contact with said bed; said floating frame including a pair of angularly related portions joined to one another; one of said angularly relative portions being interposed between said diaphragm and said rigid frame in slidable engagement with said rigid frame; the other of said angularly related portions embracing a part of the diaphragm opposed to said bed for engaging said bed according to pressure exerted by said diaphragm.

2. In a hydraulic press: a press bed; a head; means for moving said head toward and away from said bed; means providing a pressure chamber in said head including a diaphragm having a thickened marginal portion; said marginal portion having a surface for contacting said bed; said marginal portion having a flange inwardly offset from said surface and engaged with said head; a clamping frame secured to said head so as to clamp said flange to the head; said marginal portion having corner portions between said surface and said flange; a rigid floating frame embracing said corner portions and slidably engaged with said clamping frame; said diaphragm having a continuous sealing lip located in inwardly spaced relation to said flange and extending into said chamber from said marginal portion for sealing engagement with said head; and means connecting said floating frame with said clamping frame providing for limited bodily sliding movement of said floating frame relative to said clamping frame.

3. In a hydraulic press: a head adapted to engage a press bed; means providing a pressure chamber in said head including a diaphragm having a thickened marginal portion; said marginal portion having a surface for contacting said bed; said marginal portion having a flange inwardly offset from said surface and engaged with said head; a clamping frame secured to said head so as to clamp said flange to the head; said diaphragm having a continuous sealing lip located in inwardly spaced relation to said flange and extending into said chamber from said marginal portion for sealing engagement with said head; said diaphragm having a recess therein between said flange and said lip; said head having a lip extending into said recess; a rigid floating frame engaged with said surface of said diaphragm and with said clamping frame respectively; and means connecting said frames together for limited bodily movement of said floating frame relative to said clamping frame.

4. In a hydraulic press: a head adapted to engage a press bed; means providing a pressure chamber in said head including a diaphragm; said diaphragm having an inwardly bowed central portion and a thickened continuous marginal portion; said marginal portion having a continuous surface for engaging the press bed; a continuous marginal sealing flange extending laterally outward from said thickened marginal portion in inwardly spaced relation to said surface and in engagement with said head; a continuous clamping frame secured to said head and clamping said flange to said head; said diaphragm having a continuous sealing lip inwardly spaced from said flange and extending from said thickened marginal portion into said chamber in contact with walls of said chamber; a continuous floating frame embracing said thickened marginal portion and having a pair of angularly related portions one of which is slidably engaged with said clamping frame and the other of which is disposed in surrounding relation to said bed-engaging surface of said marginal portion and provides a continuous surface for also engaging said bed; and means connecting said frames together providing for limited bodily sliding movement of said floating frame relative to said clamping frame.

References Cited in the file of this patent

UNITED STATES PATENTS

| | | | |
|---|---|---|---|
| 306,914 | Fritz | Oct. 21, | 1884 |
| 503,422 | Jordan | Aug. 15, | 1893 |
| 802,128 | White | Oct. 17, | 1905 |
| 924,363 | Liddell | June 8, | 1909 |
| 1,087,795 | Lewis | Feb. 17, | 1914 |
| 1,267,591 | Rehbein | May 28, | 1918 |
| 1,402,357 | Henry | Jan. 3, | 1922 |
| 1,443,176 | Gabriel | Jan. 23, | 1923 |
| 1,529,746 | McDonald | Mar. 17, | 1925 |
| 1,937,007 | Brockel | Nov. 28, | 1933 |
| 2,148,543 | Dinzl | Feb. 28, | 1939 |
| 2,185,277 | Stelzer | Jan. 2, | 1940 |
| 2,210,591 | Langford et al. | Aug. 6, | 1940 |
| 2,295,770 | Baker | Sept. 15, | 1942 |
| 2,317,869 | Walton | Apr. 27, | 1943 |
| 2,384,160 | Ernst | Sept. 4, | 1945 |
| 2,418,393 | Bridgens | Apr. 1, | 1947 |
| 2,550,672 | Chyba | May 1, | 1951 |
| 2,696,183 | Chyba | Dec. 7, | 1954 |
| 2,741,205 | Paulton | Apr. 10, | 1956 |
| 2,771,850 | Wheelon | Nov. 27, | 1956 |
| 2,783,727 | Hoffman | Mar. 5, | 1957 |